United States Patent
Frey et al.

(10) Patent No.: US 9,079,657 B2
(45) Date of Patent: Jul. 14, 2015

(54) WING OF AN AIRCRAFT AND ASSEMBLY OF A WING COMPRISING A DEVICE FOR INFLUENCING A FLOW

(75) Inventors: Juergen Frey, Dresden (DE); Burkhard Goelling, Stuhr (DE); Heinz Hansen, Weyhe (DE); Veit Hildebrand, Dresden (DE); Klaus-Peter Neitzke, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 828 days.

(21) Appl. No.: 13/254,841

(22) PCT Filed: Mar. 4, 2010

(86) PCT No.: PCT/EP2010/001364
§ 371 (c)(1),
(2), (4) Date: Sep. 3, 2011

(87) PCT Pub. No.: WO2010/099967
PCT Pub. Date: Sep. 10, 2010

(65) Prior Publication Data
US 2012/0001028 A1    Jan. 5, 2012

Related U.S. Application Data

(60) Provisional application No. 61/157,384, filed on Mar. 4, 2009.

(30) Foreign Application Priority Data

Mar. 4, 2009 (DE) .......................... 10 2009 011 662

(51) Int. Cl.
*B64C 21/08* (2006.01)
*B64C 21/04* (2006.01)
(Continued)

(52) U.S. Cl.
CPC ................ *B64C 9/16* (2013.01); *B64C 21/025* (2013.01); *B64C 21/04* (2013.01); *B64C 21/06* (2013.01);
(Continued)

(58) Field of Classification Search
USPC ........ 244/208, 207, 209, 199.1, 199.2, 199.3, 244/204.1
See application file for complete search history.

(56) References Cited

U.S. PATENT DOCUMENTS 2,876,966 A * 3/1959 Cook ............................ 244/209
3,093,349 A   6/1963 Wagner
(Continued)

FOREIGN PATENT DOCUMENTS

CN   101267980   9/2008
DE   1 165 419   3/1964
(Continued)

OTHER PUBLICATIONS

International Search Report for Application Serial No. PCT/EP2010/001364 dated Jun. 29, 2010.
(Continued)

*Primary Examiner* — Peter M Poon
*Assistant Examiner* — Marc Burgess
(74) *Attorney, Agent, or Firm* — Jenkins, Wilson, Taylor & Hunt, P.A.

(57) ABSTRACT

A wing of an aircraft is described, having: a main wing, at least one high lift flap which can be moved between a retracted and an extended position, and a spoiler. The main wing has ejection openings, arranged side-by-side along the main wing spanwise direction, and in the main wing chordwise direction, and which are connected via an air conduit with the outlet device of a flow delivery driver device on the main wing or on the spoiler. The spoiler has inlet openings for the intake of air, which are connected via an air conduit with the inlet device of the flow delivery driver device. The flow delivery driver device has a receiver device for the reception of command signals for purposes of adjustment of the flow delivery driver device. An arrangement of a wing with a device for purposes of flow control with such a wing is also described.

20 Claims, 4 Drawing Sheets (51) Int. Cl.
  *B64C 21/06* (2006.01)
  *B64C 9/16* (2006.01)
  *B64C 21/02* (2006.01)

(52) U.S. Cl.
  CPC ............ *B64C 21/08* (2013.01); *B64C 2230/04* (2013.01); *B64C 2230/06* (2013.01); *Y02T 50/166* (2013.01); *Y02T 50/32* (2013.01); *Y02T 50/44* (2013.01)

(56) References Cited

U.S. PATENT DOCUMENTS

| | | | |
|---|---|---|---|
| 5,335,885 A * | 8/1994 | Bohning | 244/204 |
| 8,336,829 B2 | 12/2012 | Reckzeh et al. | |
| 2006/0027711 A1 | 2/2006 | Boldrin et al. | |
| 2006/0102801 A1 * | 5/2006 | Manley | 244/208 |
| 2006/0219847 A1 * | 10/2006 | Miller et al. | 244/204.1 |
| 2007/0034746 A1 | 2/2007 | Shmilovich et al. | |
| 2007/0051855 A1 | 3/2007 | Shmilovich et al. | |
| 2008/0173766 A1 * | 7/2008 | Manley | 244/208 |
| 2012/0001028 A1 | 1/2012 | Frey et al. | |
| 2013/0240676 A1 * | 9/2013 | Golling | 244/208 |

FOREIGN PATENT DOCUMENTS

| | | |
|---|---|---|
| DE | 10 2009 011 662 | 9/2010 |
| EP | 0 558 904 | 9/1993 |
| WO | WO 2007/072259 | 6/2007 |
| WO | WO 2009/004499 | 1/2009 |
| WO | WO 2010/099967 | 9/2010 |

OTHER PUBLICATIONS

International Preliminary Report on Patentability and Written Opinion for Appilication Serial No. PCT/EP2010/001364 dated Sep. 15, 2011.
Chinese Office Action for Application No. 201080010640 dated Aug. 27, 2013.
Chinese Search Report for Application No. 201080010640 dated Aug. 19, 2013.
Chinese Search Report for Application No. 201080010640 dated Jun. 18, 2014.

* cited by examiner

WING OF AN AIRCRAFT AND ASSEMBLY OF A WING COMPRISING A DEVICE FOR INFLUENCING A FLOW

RELATED APPLICATIONS

The present application is a national stage entry according to 35 U.S.C. §371 of PCT application No. PCT/EP2010/001364 filed on 4 Mar. 2010, which claims priority from German Application No. 10 2009 011 662.1, filed on 4 Mar. 2009, and from U.S. Provisional Application No. 61/157,384, filed on 4 Mar. 2009.

TECHNICAL FIELD

The invention relates to a wing of an aircraft, and also an arrangement of a wing with a device for purposes of flow control.

BACKGROUND

From the general prior art high lift systems of known art achieve their aerodynamic performance by means of shaping, i.e. curvature of the total wing by virtue of suitable adjustment relative to the main wing concerned of the high lift aids on the leading and trailing edges, coupled in each case to the latter. Especially when the high lift flap at the trailing edge of the main wing is extended, and in particular with flap setting angles for takeoff and landing configurations a gap forms between the main wing and the high lift flap, and/or an overlap occurs between main wing and flap.

The adjustment of the configurations takes place by means of appropriate flap positioning kinematics, by means of which the high lift flap is e.g. moved out of the cruise setting (clean configuration) into the setting positions or configurations prescribed in each case. In order to generate additional lift, in particular at relatively small angles of attack of the wing relative to the flow, an additional spoiler articulated in the rear region of the main wing is used for lift generation, working together with the high lift flap, and is deployed in a similar manner to the high lift flap, wherein the trailing edge flap is appropriately tracked such that overall a greater total curvature of the profile is achieved.

By virtue of weight limitations and load and safety conditions that must be fulfilled for the takeoff and landing phases, technical limits have to be taken into account for the design of this type of combination of a main wing with a lowerable spoiler and a trailing edge flap trackable in an extended setting. In particular systematic limitations with regard to the maximum possible deployment of the spoiler in conjunction with the trailing edge flap must be accepted, so that the aerodynamic performance of such a trailing edge system is limited. Furthermore in a total wing profile with a curved profile designed with a strong curvature of this kind, the risk exists of a flow separation on the upper side of the spoiler and/or the trailing edge flap.

Furthermore from the prior art flow control measures on main wings or trailing edge flaps are of known art, e.g.:
 passive vortex generators,
 devices for continuous ejection in regions at risk of separation,
 devices for the removal by suction of flow tending towards separation on the respective main wing or the respective trailing edge flap.

SUMMARY

Embodiments of the invention provide a wing of an aircraft with a high lift flap, which in particular is aerodynamically efficient even in an extended setting of the high lift flap.

Embodiments also provide an arrangement of a wing with a device for purposes of flow control, with which the flow around the wing can be controlled for purposes of adjusting to an efficient flow around the wing, in particular even at various setting statuses of the high lift flap.

In accordance with the invention a wing of an aircraft with an upper side and a lower side is provided, which has: a main wing, which has an upper surface positioned on the upper side and a lower surface positioned on the lower side, which surfaces in each case run along the main wing chordwise direction and around which the flow is in the main flow direction in accordance with requirements, at least one high lift flap coupled to the main wing such that it can move between a retracted and an extended setting, and at least one spoiler coupled to the main wing such that it can rotate, and projecting beyond the trailing edge of the same. In the extended setting of the high lift flap the trailing edge of the spoiler is located at a separation distance from the high lift flap. The high lift flap is in particular mounted such that it can rotate. In particular the wing is configured such that in the extended setting of the high lift flap this is separated from the main wing so as to leave a gap in the main wing chordwise direction, and relative to the latter is deployed downwards, wherein in the extended setting of the high lift flap the spoiler, for purposes of optimising the flow along the wing, can be rotated in the direction towards the upper side of the high lift flap.

The main wing comprises a plurality of air outlet openings or air ejection openings, of which a plurality can be arranged side-by-side along the main wing spanwise direction and in the main wing chordwise direction in the region between 40% and 90% of the wing chord of the total wing, as seen from the tip of the total wing. Alternatively to this, provision can be made that a plurality of the air outlet openings are arranged side-by-side along the main wing spanwise direction and in the main wing chordwise direction in the region between 40% and 90% of the wing chord of the main wing, as seen from the tip of the main wing. In the case where a leading edge slat is present provision can be made that the plurality of air ejection openings are positioned in the main wing chordwise direction in the region between 40% and 90% of the wing chord of the wing with the leading edge slat retracted and the high lift flap retracted, as seen from the tip of the total wing.

The air outlet openings are in each case connected in terms of flow via an air conduit with the systemic outlet device of a systemic flow delivery driver device arranged in the main wing rear wing box or in the spoiler region.

In accordance with the invention provision can furthermore be made that the spoiler has a plurality of inlet openings for the intake of air, which are arranged side-by-side in the spoiler spanwise direction and in the spoiler chordwise direction are arranged in the region between 70% and 100% of the spoiler chord as seen from the front end of the spoiler on the upper or lower side of the spoiler, and which are in each case connected in terms of flow via an air conduit with the inlet device of the flow delivery driver device, and that the flow delivery driver device has a receiver device for the reception of command signals for purposes of adjusting the flow delivery driver device. The flow control system therefore connects the inlet openings with the outlet openings. In an appropriate structural design and equipment of a systemic regulation/control of the outlet and inlet openings provision is in particular made that: a flow delivery driver device, a component for purposes of regulation and/or control of the flow delivery driver device, and one or a plurality of sensors as command signal transducers for purposes of regulation and/or control of the flow delivery driver device and/or for purposes of regulation and/or control of the outlet and inlet openings, e.g. for closing and opening, and/or for adjusting the size of opening of the outlet and inlet openings. In addition the flow control system can be connected with a flight control device, in order in simplex or duplex operation on the one hand to communicate to the pilot or autopilot the state of the flow control system, and/or on the other hand to make available necessary important data concerning the state of the total aircraft, measured quantities or prepared information, continuously or as required, for purposes of regulation and/or control of the flow control system. The requirement can be formulated within the system and/or by the pilot. With the execution of flow control in accordance with the invention the separating boundary layer flow, i.e. shear layer flow, is controlled via the in particular lowered spoiler in the configuration with a corresponding trailing edge flap with the following advantages:

an improvement of the aerodynamic performance of the total high lift system with a main wing, a spoiler, and a high lift flap, with higher lift coefficients at the same angle of attack of the wing, in particular at small angles of attack, i.e. in the linear lift coefficient region; and an increase of the maximum lift of the wing in the high lift configuration with lowered spoiler and extended trailing edge flap, and/or an increase of the maximum angle of attack of the wing.

In accordance with an example of embodiment of the invention, with a suitable design of flow control on the spoiler and a sufficiently large improvement of the aerodynamic performance together with the extended trailing edge flap, depending upon the application the leading edge slat can be dispensed with as a high lift aid on the leading edge of the main wing, or at least only a minimal design of leading edge slat can be necessary so as to achieve just a certain minimally necessary additional difference in the lift performance; this can lead to weight savings, and to the reduction of system complexity, and to the reduction of costs for the total high lift configuration and its systemic and structural design and integration into the main wing. In this context a minimal design of leading edge slat is understood to mean that the leading edge slat can be embodied with a relatively small size, insofar as it is required at all in the application intended in each case.

As a result of the reduction in weight of the high lift device that can be achieved in accordance with the invention a significant contribution to fuel saving can furthermore be achieved for a total aircraft configuration.

In accordance with the invention the following are in particular provided: a wing of an aircraft with an upper side and a lower side, having: a main wing, which has an upper surface positioned on the upper side and a lower surface positioned on the lower side, which surfaces in each case run along the main wing chordwise direction and around which the flow is in the main flow direction in accordance with requirements, at least one high lift flap coupled to the main wing such that it can move between a retracted and an extended setting, and at least one spoiler coupled to the main wing such that it can rotate, and projecting beyond the trailing edge of the same, wherein the main wing has a plurality of ejection openings, of which a plurality are arranged side-by-side along the main wing spanwise direction, and which are connected in terms of flow via an air conduit with the outlet device of a flow delivery driver device arranged on the main wing or on the spoiler, wherein the spoiler has a plurality of inlet openings for the intake of air, which are arranged side-by-side in the spoiler spanwise direction, and which are in each case connected in terms of flow via an air conduit with the inlet device of the flow delivery driver device, wherein the flow delivery driver device has a receiver device for the reception of command signals for purposes of adjusting the flow delivery driver device.

In the wing in accordance with the invention, provision can in particular be made that the plurality of ejection openings are arranged side-by-side along the main wing spanwise direction and in the main wing chordwise direction are arranged in the region between 40% and 90% of the wing chord of the total wing, and which are connected in terms of flow via an air conduit with the outlet device of a flow delivery driver device arranged on the main wing or on the spoiler.

Furthermore in the wing provision can be made that the plurality of inlet openings of the spoiler for the intake of air are arranged side-by-side in the spoiler spanwise direction and in the spoiler chordwise direction are arranged in the region between 70% and 100% of the spoiler chord, as seen from the front end of the spoiler.

The wing can have a leading edge slat, and can have the plurality of ejection openings positioned from the tip of the total wing in the main wing chordwise direction in the region between 40% and 90% of the wing chord of the wing, with the leading edge slat retracted, and the high lift flap retracted.

At a location in the main wing spanwise direction, and as seen in the main wing chordwise direction of the main wing, a plurality of ejection openings can be arranged one behind another. Alternatively ejection openings, positioned side-by-side in the main wing spanwise direction, as seen in the main wing chordwise direction of the main wing, can be arranged displaced relative to one another on the upper side of the main wing.

The ejection openings can be arranged such that the angle between the direction of the opening out of the air conduit at each ejection opening and the planar extent of the upper surface at this location is between 0 degrees and 60 degrees, so that within predetermined limits a tangential ejection of air occurs through the ejection openings.

The ejection openings on the main wing can be formed as slots and the length of at least a fraction of the ejection openings as seen in the main wing spanwise direction can be between 1% and 50% of the main wing chord at the spanwise location of the respective slot. In particular provision can be made that the width of the slot is between one hundredth and one tenth of the length of the slot.

In accordance with a further example of embodiment provision can be made that the inlet openings on the spoiler are designed as slots and the length of at least a fraction of the inlet openings as seen in the spoiler spanwise direction is between $\frac{1}{10}$ and $\frac{1}{4}$ of the spoiler chord of the spoiler at this location. In general the width of the slots on the spoiler is between 0.1 and 0.5 times the length of the slots.

In accordance with a further example of embodiment the main wing can have: on at least a fraction of the ejection openings of the main wing in each case an opening alteration device for purposes of opening and closing the respective ejection opening with an opening alteration mechanism and an actuator coupled to the latter for purposes of actuating the respective opening alteration mechanism. Here the opening alteration device can in particular have a slider, which by virtue of an actuation by the actuator partially or completely opens or closes the respective ejection opening. Furthermore provision can be made that on the basis of a regulating signal the actuator periodically opens and closes the slider and thereby the ejection opening so as to effect a pulsed ejection of the air through the ejection opening.

In accordance with a further example of embodiment a pulse generator-actuator is arranged on each of at least a fraction of the ejection openings of the main wing, which upon an appropriate input signal effects a pulsed ejection of the air. In particular the pulse generator-actuator can be a piezo-actuator.

In accordance with the invention provision can be made that an opening alteration device with an actuator is arranged on each of at least a fraction of the ejection openings of the main wing, with which the orientation of the respective ejection opening relative to the surface of the main wing can be adjusted.

The length of the rotatable slots of the opening alteration device can be between 60% and 80% of the wing chord at the spanwise location of the respective slot.

In accordance with the invention provision can be made that the angle of inclination between the centerline of the cross-sectional area of the screen opening and the main wing spanwise direction, or the tangent to the edge line at the spanwise location of the axis of rotation of the screen, can be adjusted between 20 degrees and 80 degrees.

In general, a driver device for purposes of generating driver signals to control the flow delivery driver device can be assigned to the actuator, and in particular can be arranged on the latter, wherein the driver device is functionally connected with the flow delivery driver device and transmits the driver signals generated to the flow delivery driver device.

In accordance with a further aspect of the invention an arrangement of a wing with a device for purposes of flow control is provided; the wing is formed in accordance with an example of embodiment of the invention, and the device for purposes of flow control has: a driver device functionally connected with a flight control device to control the performance of the flow delivery drive, wherein the driver device has a driver function, which receives from the flight control device the setting status of the spoiler and/or the setting status of the high lift flap as an input parameter, and on the basis of the setting statuses in each case generates an appropriate driver signal for purposes of driving the flow delivery drive and transmits this to the latter to control the through flow of the flow delivery drive.

In the arrangement of a wing with a device for purposes of flow control the latter can in particular have: a driver device functionally connected with a flight control device to control the opening alteration device, a driver device functionally connected with a flight control device to control the opening alteration device, wherein the driver device has a driver function, which receives from the flight control device the setting status of the spoiler and/or the setting status of the high lift flap as an input parameter, and on the basis of the setting statuses in each case generates an appropriate regulating signal for purposes of driving the opening alteration device and transmits this to the latter to control the adjustment of the opening alteration device.

In accordance with a further example of embodiment of the invention thereby:

the device for purposes of flow control can have: a sensor device arranged on the main wing, and/or on the spoiler, and/or on the high lift flap, with a sensor to record the status of the flow attached to or separated from the upper side of the spoiler, and/or the upper side of the high lift flap, which is functionally connected with the driver device, and the driver function has a control function to control a prescribed flow parameter of the adjustable flap, which is functionally connected with the sensor device for purposes of receiving current flow parameters, with the adjustable flap positioning device for purposes of receiving a parameter for the setting status of the adjustable flap, and with the flow delivery drive and/or opening alteration device for purposes of transmitting a regulating signal to regulate the through flow of the flow delivery drive and/or opening alteration device.

The sensor device can in particular be positioned in the region between 40 and 90 percent of the total main wing chord of the main wing, and/or in the region between 40 and 90 percent of the total spoiler chord of the spoiler, and/or in the region between 40 and 90 percent of the total flap chord of the high lift flap. The sensor can be a hot wire sensor for purposes of recording the velocity gradient. The driver function can have a function for purposes of converting the velocity gradient into a wall shear stress and the driver signals can be determined on the basis of the wall shear stress determined. The sensor can also be a piezo-wall shear stress sensor for purposes of recording the wall shear stress.

The additional fluid or air, which is introduced via air outlet openings into the flow around the wing, is introduced tangentially into the separating boundary layer flow, i.e. shear layer flow, on the wing so that as a result of the effect of the additional momentum provided in accordance with the invention the incipient separation is prevented, and the flow around the trailing edge flap is also used effectively for a better lift characteristic to improve the performance of the total high lift wing. In addition to the continuous and/or pulsed ejection dynamically operating actuators, can also be actively deployed, combined with the continuous and/or pulsed ejection; these suitably energise the boundary layer flow, i.e. shear layer flow, that is tending towards separation so as to achieve a more efficient system for separation control. In accordance with the invention a wing can be implemented in this manner, which in particular has a lowerable spoiler with an integrated, autonomously operating flow control system and optionally an additional driver device. With periodic/pulsed and/or continuous ejection in the kink region, which can be located in particular in the region from 40% to 90% in the chordwise direction of the profile of the main wing, and removal by suction on the spoiler surface and/or on its trailing edge, which in particular can be located between 70% (in particular 80%) and 100% of the profile chord of the spoiler on the upper and/or lower side, a supply and compression of the fluid, e.g. air, removed by suction takes place for purposes of ejection in the kink region of the main wing. A flow control system with the flow delivery driver device, and optionally an additional driver device to control the through flow of air flowing through the outlet and inlet openings, and/or an optionally provided additional control device for purposes of controlling the flow control, i.e. control of the volumetric flow rate or another equivalent parameter at the inlet and outlet openings, can either or both be structurally integrated in particular in the spoiler or in the main wing.

BRIEF DESCRIPTION OF THE DRAWINGS

In what follows examples of embodiment of the invention are described with the aid of the accompanying figures, where.

DESCRIPTION

Figure 1:
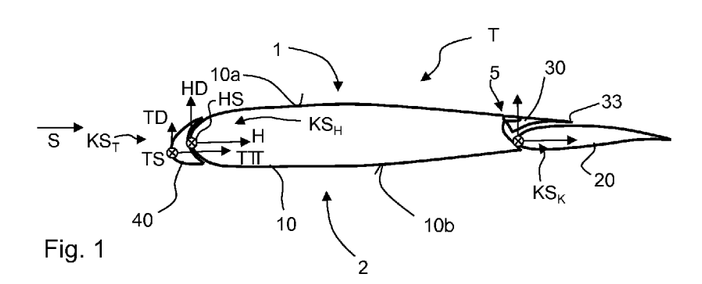
FIG. 1 shows a schematic representation of a total wing, to which the invention is applicable, with a main wing, and in this a flow delivery drive, a leading edge slat, a high lift flap, and a spoiler, wherein the main wing, the leading edge slat, the high lift flap and the spoiler are in each case shown in their initial states or retracted settings (clean configuration)

The invention concerns a wing T of an aircraft with an upper side 1 and a lower side 2. The example of embodiment represented in FIG. 1 of the wing T has a main wing 10 fitted to the fuselage of the aircraft, a high lift flap 20 arranged on the rear side of the main wing 10, movable relative to the latter, a spoiler 30 likewise arranged on the rear side of the main wing 10, movable relative to the latter, and also a leading edge slat 40 arranged on the front side of the main wing 10, movable relative to the latter. For purposes of further description of the wing T and the features in accordance with the invention, and also the examples of embodiment of the invention in the figures $KS_T$ is registered as a coordinate system for the whole wing T with a wing chordwise direction TT, a wing spanwise direction TS and a wing thickness direction TD as coordinate axes;

$KS_H$ is registered as a coordinate system for the main wing 10 with a main wing chordwise direction HT, a main wing spanwise direction HS and a main wing thickness direction HD as coordinate axes;

$KS_{Sp}$ is registered as a coordinate system for the spoiler 30 with a spoiler chordwise direction SpT, a spoiler spanwise direction SpS and a spoiler thickness direction SpD as coordinate axes; and $KS_H$ is registered as a coordinate system for the high lift flap 20 with a high lift flap chordwise direction HT, a high lift flap spanwise direction HS and a high lift flap thickness direction HD as coordinate axes.

As seen in the wing spanwise direction TS of the wing T, a plurality of high lift flaps 20, a plurality of spoilers 30, and also a plurality of leading edge slats 40 can also be arranged side-by-side in each case. The main wing 10 has an upper surface 10a positioned on the upper side, and a lower surface 10b positioned on the lower side, which surfaces in each case run along the main wing chordwise direction HT and around which the air flows in a flow direction S in accordance with requirements. The high lift flap 20 is coupled to the main wing 10 and can be moved between a retracted and an extended position. The spoiler 30 is coupled to the main wing 10 such that it can move and in particular rotate, and projects beyond the trailing edge 5 of the same, wherein in the extended position of the high lift flap 20 the latter is separated from the main wing 10 to leave a gap in the main wing chordwise direction HT and is deployed downwards relative to the latter. Furthermore in the extended position of the high lift flap 20 the spoiler 30 can be rotated for purposes of optimising the flow S along the wing in the direction towards the upper side 20a of the high lift flap 20, if the latter is extended, or is moved into a further extended position. Here provision can in particular be made that in the movement of the high lift flap 20 from an initial setting into a further extended setting the high lift flap 20 is moved further rearwards and/or also further downwards relative to the main wing 10, so that in this case provision is in particular made that the trailing edge 39 of the spoiler 30 is moved so as to track the related surface or upper side 20a of the high lift flap 20, so that the gap S1, i.e. the separation distance between the trailing edge 39 and the upper side 20a of the high lift flap 20, maintains a predetermined dimension.

In accordance with the invention for purposes of increasing the lift coefficient of the wing T with a high lift flap 20 provision is made to provide ejection openings 11 on the main wing 10, which are arranged side-by-side along the main wing spanwise direction HS and in the main wing chordwise direction HT are arranged from the tip of the total wing T in the region between 40% (G1) and 90% (G2) of the wing chord of the total wing T with the high lift flap 20 retracted.

Figure 2:
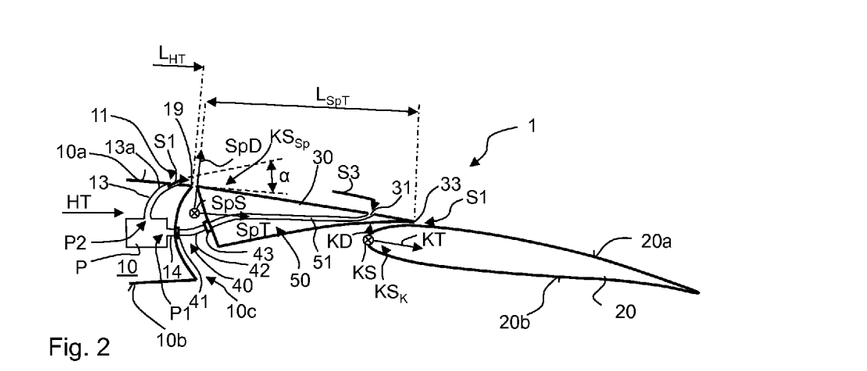
FIG. 2 shows a scrap sectional representation of a rear region of an example of embodiment of the wing in accordance with the invention, in the main wing of which are integrated a flow delivery drive, an ejection opening and an outlet conduit connecting the flow delivery drive and the ejection opening, wherein the high lift flap is shown in an extended setting and the spoiler is shown in a setting tracking the high lift flap and moved downwards, and wherein the ejection opening is arranged at a first location on the surface of the main wing.
Figure 3:
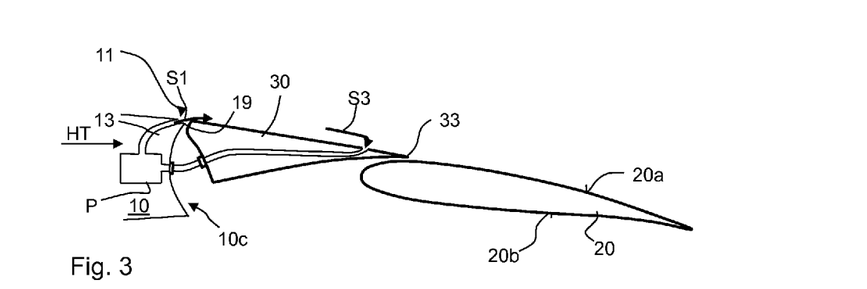
FIG. 3 shows a scrap sectional representation of the rear region of an example of embodiment of the wing in accordance with the invention, in which the ejection opening is provided at an alternative location on the main wing, wherein the high lift flap and the spoiler are shown in the settings shown in FIG. 2.
Figure 4:
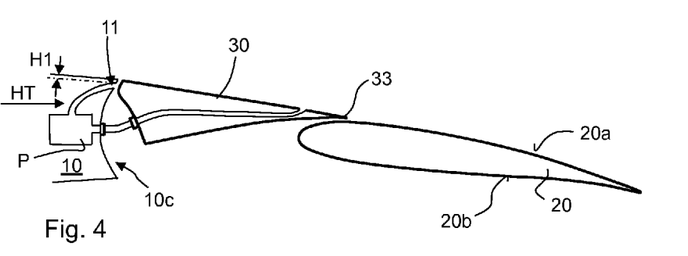
FIG. 4 shows a scrap sectional representation of the rear region of an example of embodiment of the wing in accordance with the invention in accordance with FIG. 3, wherein the high lift flap and the spoiler assume settings that are further extended than the settings shown in FIG. 3.
Figure 5:
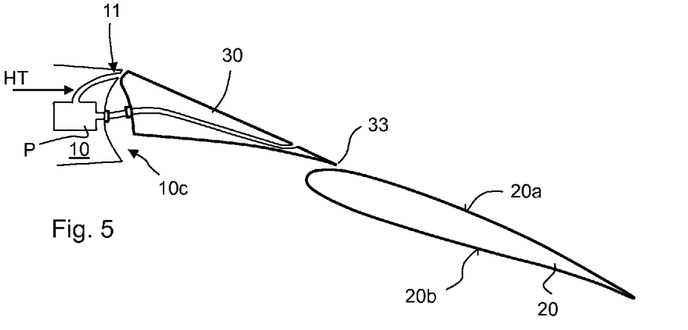
FIG. 5 shows a scrap sectional representation of a rear region of an example of embodiment of the wing in accordance with the invention in accordance with FIG. 3, wherein the high lift flap and the spoiler assume settings that are further extended than the settings shown in FIG. 3.

Here all or a fraction of the ejection openings can be arranged on the upper side 10a of the main wing 10 (FIG. 2), or on its trailing edge 19 (FIG. 3), or on the rear side 10c (FIGS. 4 and 5) of the main wing 10. In addition a plurality of ejection openings 11 can also be arranged one behind another in the main profile chordwise direction HT, so that ejection openings 11 can e.g. be arranged in a matrix form along the trailing edge 19 of the main wing 10. The ejection openings 11, as seen in the main profile chordwise direction HT and/or in the main wing spanwise direction HS, can also be arranged displaced relative to one another. The wing T has furthermore a flow delivery driver device P with an inlet device P1 and an outlet device P2. The flow delivery driver device P can in particular be arranged and integrated or installed on the main wing 10, or on the spoiler 30. The ejection openings 11 are connected in terms of flow via one air conduit 13 in each case, or via a common air conduit 13, with the outlet device P2 of the flow delivery driver device P.

In an example of embodiment, in which the wing T has a leading edge slat 40 (FIG. 1) the plurality of ejection openings can alternatively be positioned from the tip of the total wing in the main wing chordwise direction (HT) in the region between 40% and 90% of the wing chord of the wing T, with the leading edge slat 40 retracted, and with the high lift flap 10 retracted.

The flow delivery driver device P can in particular take the form of a pump, or a compressor, or a systemic device, which is designed such that with regulation or control it sucks in the necessary volumetric flow rate from the air inlet openings and can deliver the necessary volumetric flow rate to the air outlet openings corresponding to the operating state stipulated.

In accordance with the invention provision can furthermore be made that the spoiler 30 has a plurality of inlet openings 31 for the intake of air, which are arranged side-by-side in the spoiler spanwise direction SpS, and in the spoiler chordwise direction SpT are arranged in the region between 80% and 100% of the total spoiler chord, as seen from the front end of the spoiler, on the upper and/or lower side of the spoiler, and which in each case are connected in terms of flow via an air conduit 40, 101 with the inlet device P1 of the flow delivery driver device P.

In the definition of the location of the outlet openings relative to the wing chord of the wing, and/or the location of the inlet openings relative to the spoiler chord, the centre of area of the respective ejection openings, and/or the respective inlet openings can in particular provide the basis for the location of the outlet openings and/or of the inlet openings.

The flow delivery driver device P has a receiver device for the reception of command signals for purposes of adjustment of the delivery performance of the flow delivery driver device P, so as to adjust and control the through flow of the airflow S1, which exits the ejection openings 11 (arrow S1) and which is supplied into the air S flowing around the wing. By means of this driver the flow S tending towards separation at the point of transition from the main profile to the spoiler, in other words at the kink 19 or at the rear end 19 of the upper side 10a of the main wing 10 is reattached or held attached on the spoiler 30. By the ejection of air through the ejection openings 11, in other words by the driver of the surrounding flow S, the behaviour of the flow, firstly around the spoiler 30, and also further downstream of the spoiler 30 and the high lift flap 20, is improved. In particular, by the further driver in accordance with the invention of the flow S by the removal of air by suction (arrow S3) from the air S flowing around the wing T at the trailing edge of the spoiler 30, the reattachment and/or stabilisation of the flow around the spoiler is assisted. By the systematic coupling of the removal by suction of the fluid flowing around the trailing edge region of the spoiler, and the ejection, in particular tangential ejection of fluid in the "kink" region of the transition from the main profile 10 to the spoiler 30, an integrated total system for separation control, and thus for increase of lift is created for a wing T by controlling the instability behaviour of the separating shear layer flow, in particular with pulsed ejection, and by circulation control, in particular with continuous ejection at the kink and inwards suction at the trailing edge of the spoiler.

The removal by suction of fluid at the trailing edge of the lowered spoiler 30 can in particular be provided in the takeoff or landing configurations of the wing T. By this means the energy requirement for the ejection of fluid in the "kink" region of the high lift spoiler is reduced, and the aerodynamic efficiency of the total system is improved.

In accordance with an example of embodiment of the invention provision is made to connect the plurality of ejection openings 11 and one inlet opening 31 or a plurality of inlet openings 31 via an air conduit device 101, or in particular in the case of spanwise application on the main profile, and, when a plurality of spoiler flaps are used, to connect a plurality of air conduit devices 101 one with another. The coupling of the plurality of ejection openings 11 and the plurality of inlet openings 31 takes place by means of a suitable system with the air conduit device 101 and the flow delivery driver device P integrated in the spoiler 30. For purposes of connecting the air conduit device 101 on the side of the main wing 10 with the inlet device P1 of the flow delivery driver device P, the end of the air conduit device 101 positioned at this side is provided with a connector piece 43. Similarly the conduit section 14 running in the main wing 10 from the outlet device P2 towards the rear side 10c of the main wing 10 facing towards the spoiler 30 has a connector piece 41 on the rear side 10c. A connecting conduit 42 is coupled with the connector pieces 41, 43, and thus connects the air conduit device 101 with the conduit section 14 and consequently the inlet opening 31, or inlet openings 31, of a spoiler 30, or a plurality of spoilers 30, with the inlet device P1 of the flow delivery driver device P. Here provision can be made that with an air conduit device 101 each inlet opening 31 is connected in each case with an inlet device P1 of the flow delivery driver device P.

Provision can also be made that a plurality or all inlet openings 31 of a spoiler 30 and/or a plurality of spoilers 30 arranged side-by-side along the main wing spanwise direction HS are connected via an air conduit device 101 in each case with an inlet device P1 of the flow delivery driver device P. In this case the air conduit device 101 can be formed from a connecting device (not shown) and an air conduit channel 51, wherein a plurality of inlet openings 31 of a spoiler are transformed by means of the connecting device into one or a plurality of air conduit channels 51, using conduit technology. For purposes of connection of air conduit channels 51 of various spoilers 30 with an inlet device P1 of the flow delivery driver device P provision can in particular be made that the at least one air conduit channel 51 of a spoiler 30 in each case opens out into a connector piece 43, that a connecting conduit 42 in each case connects a connector piece 41 with a connector piece 41 and that the conduit section 14 at the rear side 10c of the main wing 10 is designed as a connecting device, which connects a plurality of connector pieces 41 with one or a plurality of inlet devices P1 of the flow delivery driver device P.

With the performance of the flow delivery driver device P appropriately designed and the connecting pressure lines 101, 42, 40, 13 appropriately dimensioned, provision of a suitable volumetric flow rate and as much volumetric flow as required can be achieved in particular in the interior of the spoiler and/or in the rear wing box region of the main wing 10. The total system can in this manner be used efficiently in terms of energy, since the additional fluid necessary, e.g. the necessary quantity of air or volumetric flow rate downstream, that is to say, on the upper side 30a of the spoiler 30 can be removed by section and metered upstream into the separating boundary layer flow, and, depending upon the configuration, can be introduced into the air S flowing around the wing.

For this purpose in accordance with the invention a flow control device is provided, which has a driver device 101 that is functionally connected with a flight control device 100 to control the performance of the flow delivery driver P. Here the driver device 101 has a control function, which receives from the flight control device 100 the setting status of the spoiler 30 and/or the setting status of the high lift flap 20 as an input parameter, and on the basis of the setting statuses in each case generates an appropriate regulating signal for purposes of driving the flow delivery drive P, and transmits this to the latter to regulate the through flow of the flow delivery drive P.

The ejection openings 11 are in each case connected via a conduit 13 with the inlet device P1 of the flow delivery driver device P. Here provision can be made in each case that an ejection opening 11 is connected in each case with an outlet device P2 of the flow delivery driver device P. Alternatively provision can be made that a plurality or all ejection openings 11 of the main wing 10 are connected via a conduit section 13 or a connector device in each case with an outlet device P2 of the flow delivery driver device P. Here a plurality or all ejection openings 11 can also be connected via a common conduit 13 with the flow delivery driver device P. A plurality of flow delivery driver devices P can also be arranged in the main wing; in particular these are positioned side-by-side in the main wing spanwise direction HS and are connected in each case via their inlet devices P1 with a plurality of ejection openings 11.

The conduit 13 has an end section 13a, the end of which forms an ejection opening 11. To optimise the effects in accordance with the invention a specific direction of the central axis or longitudinal axis of the conduit end section 13a, in what follows also called the direction of the end section 13a, can be provided. Here provision can in particular be made that the ejection openings 11 are arranged on the main wing 10 such that the angle α between the direction of the end section 13a, or the opening out of the air conduit 13 at each ejection opening 11, and the planar extent of the upper surface 10a at this location, is between 0 degrees and 60 degrees, so that within predetermined limits in the aerodynamic effect a tangential ejection S1 of air takes place through the ejection openings 11. In this context the planar extent of the upper surface 10a can in particular be defined by the direction of the tangent to the surface 10a of the main wing 10, wherein for this purpose the direction of the tangent in the main wing chordwise direction HT is to be used as a reference.

Figure 6:
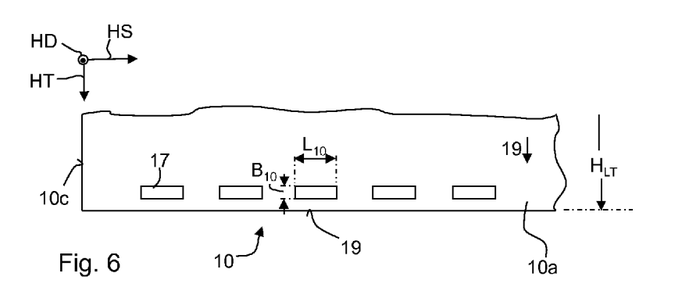
FIG. 6 shows a schematic plan view onto a rear section of part of a main wing with a representation of a number of ejection openings.

The ejection openings 11 on the main wing 10 can in particular be formed in the shape of slots, as is represented in FIG. 6. FIG. 6 represents a part of the main wing 10, with a wing chord of $H_{LT}$, and with the rear end 19, the upper side 10a of the main wing 10, and a side edge 10c running transverse to the latter. A plurality of slots run side-by-side along the rear end 19, as seen in the main wing spanwise direction HS, wherein the longitudinal direction of the same runs along the rear end or edge 19 of the upper side 10a of the main wing 10. The edge can be defined by the rearmost location of the main wing HT, as seen in the main wing chordwise direction HT. The longitudinal direction of the ejection openings 11 can in particular be defined by means of the centerline of the cross-sectional area of the opening, along the longer in each case of the edge lines of the respective slot opening. The length $L_{10}$ of the slot 17 can in particular be between 1% (one percent) and 50% (fifty percent) of the main wing chord at the spanwise location of the respective slot. The length of the slot L10 depends on, amongst other factors, the possible structure of the main wing, in particular the structure supporting the wing across the span, with regard to strength and material requirements. The width $B_{10}$ of the slot can in particular be between one hundredth (1/100) and one tenth (1/10) of the length $L_{10}$ of the slot. In accordance with an alternative example of embodiment the slots can also be arranged such that their longitudinal direction $L_{10}$ runs along, or inclined at an angle between 0 degrees and 90 degrees to, the main wing chordwise direction HT.

Figure 7:
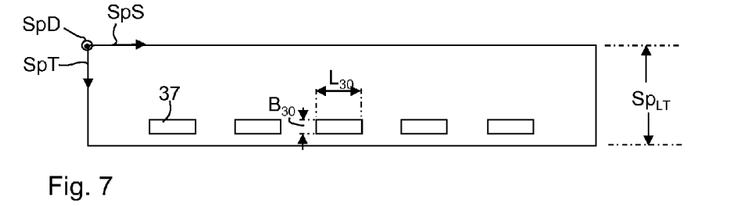
FIG. 7 shows a schematic representation of a spoiler in plan view with a number of inlet openings.

Likewise the inlet openings 31 on the spoiler 30 can in particular also have the form of slots 37. In accordance with an example of embodiment with a straight line profile or a curved profile for the edge lines of the respective openings, the length $L_{37}$, as seen in the spoiler spanwise direction SpS, is between one tenth (1/10) of the spoiler chord $L_{SpT}$ and 9/10 of the total span of the respective spoiler flap of the spoiler 30 at this location. The width $B_{37}$ of the slot can in particular be between one hundredth (1/100) and one fifth (1/5) of the length $L_{37}$ of the slot. In accordance with an example of embodiment the slots 37 are arranged side-by-side along the spoiler spanwise direction SpS (FIG. 7), wherein the longitudinal direction of the same runs along the rear end 39 of the upper side 30a of the spoiler 30. The longitudinal direction can in particular be defined by means of the centreline of the cross-sectional area of the opening along the longer in each case of the edge lines of the respective slot opening. In accordance with an alternative example of embodiment the slots 37 can also be arranged such that their longitudinal direction $L_{37}$ runs along the spoiler chordwise direction SpT.

The ejection openings and/or the inlet openings can in general be formed as circular and/or elliptical holes. Here the ejection openings 17 and/or the inlet openings 37 can also have a round or an elliptical opening edge.

The ejection openings and/or the inlet openings can in general have straight (FIGS. 6 and 7) and/or curved edge lines. Here the ejection openings 17 and/or the inlet openings 37 can also be formed with a quadrilateral or other polygonal shape for the opening edge. In particular the openings can have a rectangular shape. Here the corners can be configured so as to be rounded off (not shown in the figures).

Figure 8:
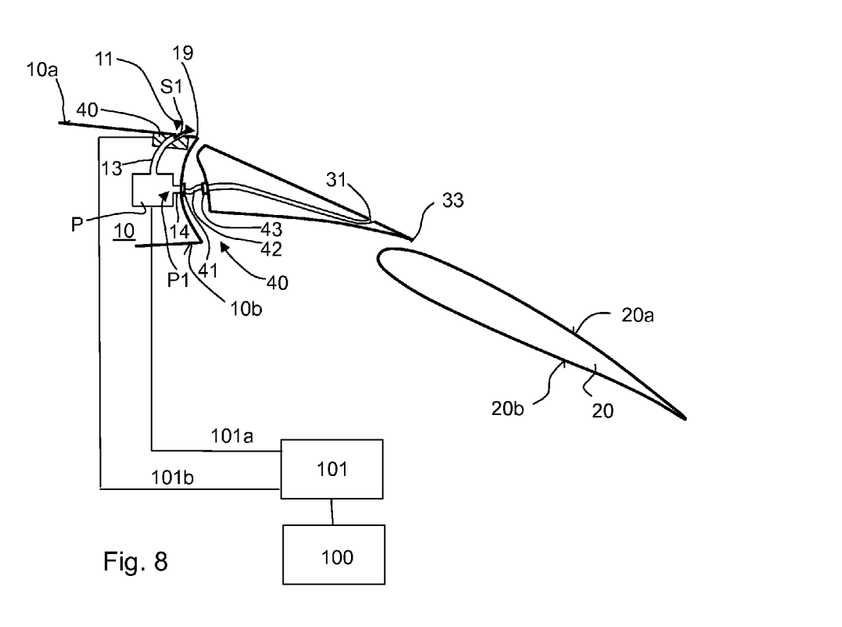
FIG. 8 shows a scrap sectional representation of a rear region of an example of embodiment of the wing in accordance with the invention, with a schematic representation of a driver device for purposes of driving the flow delivery drive and an opening alteration device for the opening and closing of ejection openings on the main wing.

For purposes of driving and/or controlling the flow delivery driver device P a driver device 101 is provided in the aircraft, which is functionally connected with the actuator via a signal line 101a (FIG. 8).

In accordance with an example of embodiment in accordance with the invention the ejection openings 11, or a fraction of the same, can be provided with an opening alteration device 40 (in FIGS. 8 and 9 only represented schematically), with which the size of the respective ejection openings 11 and/or the orientation of the respective ejection openings 11 can be altered, and which is coupled to an opening alteration mechanism and to an actuator coupled to the latter for purposes of actuation of the respective opening alteration mechanism. For purposes of driving and/or controlling the actuator of the respective opening alteration device a driver device 101 is provided in the aircraft, which is functionally connected with the actuator via a signal line 101b.

The opening alteration device 40, for purposes of alteration or adjustment of the size of the respective ejection openings 11, can have a slider 51, which is movably arranged on the upper side 10a of the main wing 10, and which by virtue of an actuation by means of the actuator partially or completely opens or closes the respective ejection opening 11. The slider is guided on a guidance device, which is arranged on an appropriate component of the main wing 10.

The combination of the driver device and the opening alteration device 40, or slider, can in particular be configured such that with the opening alteration device 40 a pulsed ejection of the air (arrow S1) is effected through the respective ejection opening 11. This can be implemented in that the opening alteration device 40, in particular in the embodiment as a slider, is periodically activated by the driver device 101 such that the opening alteration device 40, or slider, can periodically be moved from an open setting into a less open, or closed, setting. By this means the ejection opening 11 periodically opens and closes so as to produce a pulsed ejection of the air through the ejection opening 11. Alternatively to this the ejection openings 40 can be formed from a pulse generator-actuator, which upon an appropriate input signal effects a pulsed ejection of the air. The pulse generator-actuator can in particular be a piezo-actuator, which functions on the basis of a chamber principle, and by virtue of an appropriate actuation narrows or widens a chamber, so as alternatively to increase or reduce the through flow of air through the ejection opening 11. The use of the piezo-actuator for this purpose has the advantage that only a relatively small amount of energy is required to produce a pulsed ejection. The pulse generator-actuator can also be implemented in the form of a cylinder with an outlet opening, which is rotatably mounted on at least one outlet opening 11 such that at a predetermined angular location of the cylinder the outlet opening of the cylinder completely or partially covers the at least one outlet opening 11. With this form of embodiment, in particular with a constant rotational speed of the cylinder, a pulsed discharge of the air (arrow S1) can be achieved on at least one ejection opening 11.

Alternatively or additionally provision can be made that on at least a fraction of the ejection openings 11 of the main wing 10 an opening alteration device with an actuator is arranged in each case, with which the orientation of the respective ejection opening 11 can be adjusted relative to the surface of the main wing 10. Here the opening alteration device 40 can be implemented in the form of a screen with an opening (not represented), arranged such that it can rotate on or underneath the opening 11 on the upper side 10*a* of the main wing 10. The axis of rotation of the screen is thereby vertical to the planar extent of the upper side 10*a* at this location, or to the tangent running in the main wing chordwise direction HT at this location. The screen is sealed relative to the shell section with the upper side 10*a*, so as to avoid flow losses and turbulence of the flow around the main wing. The screen opening is, at least in its width and/or in its surface area, of smaller dimensions than the ejection openings 11, on which the screen is arranged. Furthermore, the screen is configured and arranged on the shell section with the upper side 10*a*, such that the edge lines of the screen opening running in the longitudinal direction of the screen, which therefore run along the main wing spanwise direction HS, at least in a range of rotational settings, dependent upon the respective rotational setting, run more or less inclined to the main wing spanwise direction HS. In this manner the orientation of the respective ejection opening 11 can be adjusted relative to the surface of the main wing 10. For this purpose an actuator, e.g. a piezo-actuator, is coupled to the screen, which actuator in turn is functionally connected with the driver device 101 for purposes of positioning the rotational setting of the screen, which driver device for this purpose generates commands for the adjustment of the rotational setting and transmits these to the actuator.

In an example of embodiment the screen can be configured for this purpose such that the length of the rotatable slot is between 60% and 80% of the main wing chord at the location of the main wing spanwise direction HS of the respective slot. By this means it is achieved that the length of the adjustable slot of the screen is between a half and up to four times the thickness of a boundary layer on the upper side 10*a* at this main wing position in the normal flight regimes of the aircraft. In these parameters the length is defined as described in the context of equipment with fixed slots 17, 37, i.e. the longitudinal direction of the ejection openings 11 can in particular be defined by means of the centreline of the cross-sectional area of the opening along the longer in each case of the edge lines of the respective slot opening. The opening alteration device 40 can in particular be configured for purposes of adjusting the orientation of the respective ejection opening such that the angle of inclination between the centreline of the cross-sectional area of the opening of the screen and the main wing spanwise direction HS or the tangent to the edge line 19 at the spanwise location of the axis of rotation of the screen can be adjusted between 20 degrees and 80 degrees.

In accordance with a further aspect of the invention an arrangement of a wing T with a device for purposes of flow control is provided, which has: the driver device 101, to control the performance of the flow delivery drive P, which is functionally connected with an adjustable flap positioning device, and which has a driver function so as to control or adjust the performance of the flow delivery drive P and/or the opening alteration device 40 in accordance with an example of embodiment in accordance with the invention. Here the driver device 101 and the flight control device 100 are embodied such that the driver device 101 receives from the flight control device 100 the setting status of the spoiler 30 and/or the setting status of the high lift flap 20 as an input parameter, and on the basis of the setting statuses in each case generates an appropriate regulating signal for purposes of driving the flow delivery drive P and transmits this to the latter to control the through flow of the flow delivery drive P, and/or on the basis of the set states in each case generates an appropriate regulating signal for purposes of driving the opening alteration device 40, and transmits this to the latter to control the adjustment of the opening alteration device 40. The adjustment of the opening alteration device 40 can in particular be an opening and closing setting of the respective ejection opening by means of an opening alteration device 40 and/or the orientation of a movable screen, or of ejection openings 11, and/or the adjustment of the pulse rate of a pulse generator-actuator.

The driver device 101 can be implemented functionally or in modular form in the flight control device, or as a unit that is separate from the latter. The driver device 101 can in particular be structurally integrated in the main wing.

In accordance with an example of embodiment, therefore, a driver device 101 for purposes of generating driver signals to control the flow delivery driver device P can be arranged with the flow delivery driver device P, wherein the driver device 101 is functionally connected with the flow delivery driver device P and transmits the driver signals generated to the flow delivery driver device P. In accordance with a further example of embodiment a driver device 101 for purposes of generating driver signals to control the actuator of the opening alteration device can be arranged with the actuator, wherein the driver device 101 is functionally connected with the actuator of the opening alteration device and transmits the driver signals generated to the actuator of the opening alteration device. In the design of the opening alteration device 40 as a device for opening and closing the respective ejection opening 11, with an opening alteration mechanism and an actuator coupled to the latter for purposes of actuating the respective opening alteration mechanism, the driver device 101 can have a driver function functionally connected with the respective actuator for purposes of generating a command signal to control the actuator. The driver device 101 generates from the setting status of the high lift flap 20 and/or of the spoiler 30 an appropriate signal for purposes of opening and closing the at least one ejection opening and/or the at least one ejection opening transmits this to the actuator.

For this purpose the driver function can have an assignment table, in which setting statuses of the high lift flap and/or the spoiler and command signals to control the through flow of the flow delivery drive P and/or the opening alteration device 40 are assigned, wherein the driver function, upon receipt of the setting statuses, generates the command signals by means of the assignment table.

Furthermore, in these forms of embodiment provision can be made that the driver device 101 has a receiver device with a functional interface to a flight control system for purposes of receiving requirements for the performance of the flow delivery drive P and/or the opening alteration device 40, and has a driver function which from these requirements generates the command signals for purposes of adjusting the flow delivery drive P and/or the opening alteration device 40.

Figure 9:
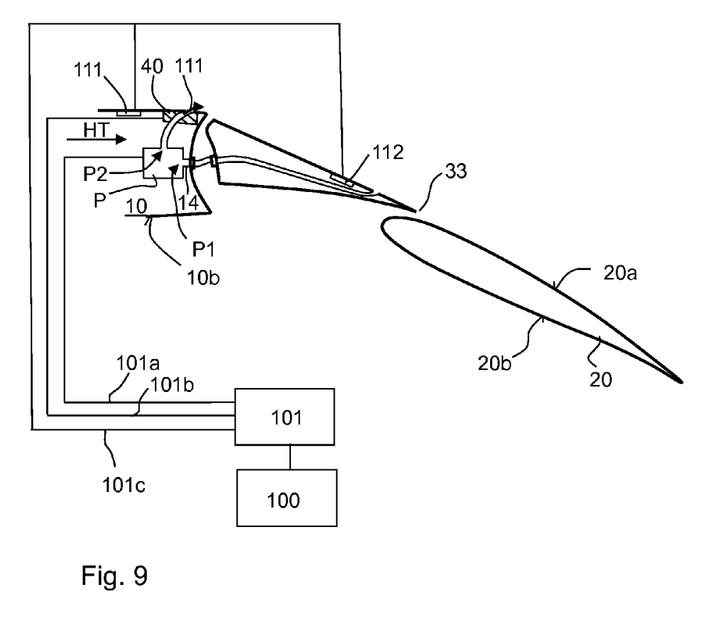
FIG. 9 shows a scrap sectional representation of a rear region of an example of embodiment of the wing in accordance with the invention, with a schematic representation of a control device for purposes of driving the flow delivery drive and an opening alteration device for the opening and closing of ejection openings on the main wing.

In accordance with a further example of embodiment of the invention the device for purposes of flow control can have: a sensor device arranged on the main wing 10, and/or on the spoiler 30, and/or on the high lift flap 20, with a sensor for purposes of recording the flow status of the flow attached to, or separated from, the upper side 30a of the spoiler 30 and/or the upper side 20a of the high lift flap 20, which sensor is functionally connected with the driver device 101. Here provision can furthermore be made that the driver function has a function that takes account of the flow state recorded in the determination of the command signals. FIG. 9 represents an example of embodiment with a first sensor device 111 arranged on the main wing 10 and a second sensor device 112 arranged on the spoiler 30.

In accordance with a further example of embodiment the driver function can have a control function for purposes of controlling a prescribed flow parameter for the adjustable flap, which is functionally connected with the sensor device, or with the sensor devices for purposes of receiving current flow parameters. Here the driver function or the control function can be functionally connected with the first sensor device 111 and/or with the second sensor device 112. Furthermore the control function drives the flow delivery driver device P and/or an opening alteration device 40 on the ejection openings 11 in the manner described so as to adjust the flow S in the region of the trailing edge region of the main wing 10 and the spoiler 30, and consequently also on the high lift flap 20, in a predetermined manner. The adjustment of the flow thus takes place by adjusting the flow delivery driver device P in accordance with the invention, and/or an opening alteration device 40 in accordance with the invention, on the basis of the positioning commands of the control function. Here, depending upon the example of embodiment, the control function 101 can be functionally connected with one or both of the sensor devices 111, 112 and with the flow delivery driver device P, and/or an opening alteration device 40. FIG. 9 represents an example of embodiment in which the control function as a part of the driver function 101 receives sensor inputs from both the first and also the second sensor devices, 111 and 112 respectively; from these, so as to achieve prescribed sensor preset values, it generates control commands for purposes of adjusting the flow delivery driver device P and/or an opening alteration device 40 in accordance with the invention, and transmits these commands to the latter so as to achieve the flow around the wing T that is to be maintained. Here it can be prescribed that the preset values to which the sensors are to be regulated, which are used in the control, can, for example, be prescribed in terms of a functional relationship, or can be prescribed and determined in the form of a table as a function of the setting status of the spoiler and/or of the high lift flap 20, which status is selected or adjusted by the aircraft control device 100. In the determination of the preset values to which the sensors are to be regulated further parameters that are determined in the aircraft control device 100 and transmitted to the driver device, such as e.g. the velocity of the aircraft relative to the air, or the dynamic pressure, and/or the temperature of the air, can be taken into account in the function and/or table.

By means of the control an increase in the efficiency of the aerodynamic performance is achieved. The control can be used as an input parameter of the lift coefficient, a particular measurement parameter for purposes of describing the flow state on the spoiler, and/or on the trailing edge flap, and/or of the aerodynamic performance of the high lift configuration. The volumetric flow rate at the inlet and ejection openings and/or devices can be used as an output parameter in the control.

Each sensor device 111, 112 used in a example of embodiment has in each case a sensor for purposes of recording the flow status of the flow attached to, or separated from, the upper side 30a of the spoiler 30, and/or the upper side 20a of the high lift flap 20. The sensors are functionally connected with the driver device 101 (lines 101c). A sensor can thereby in particular be positioned in the region between 40 and 100% of the total main wing chord $L_{HT}$ of the main wing 10, and/or in the region between 40 and 100% of the total spoiler chord $L_{SpT}$ of the spoiler 30. Alternatively or additionally a sensor can be positioned in the region between 40 and 100% of the total high lift flap chord of the high lift flap 20.

In one of these sensor configurations with a functional connection to the driver device 101, the driver device 101 can be functionally connected with an opening alteration device 40, and/or a flow delivery driver device P. In the form of embodiment of the invention represented in FIG. 9 the driver device 101 is functionally connected with a first and a second sensor device 111, 112, and also with an opening alteration device 40, and also with a flow delivery driver device P, so as to implement a closed-loop control circuit in the manner described.

The mass or volumetric flow rate to be applied in each case for the ejection on the main profile 10 in the "kink" region, and the removal by suction in the trailing edge region of the spoiler 30, is therefore either prescribed by the recording of the flight status of the aircraft with classic sensors for purposes of aircraft control, by the recording of the flow state on the spoiler, and/or trailing edge flap, by means of sensors, or takes place by means of active-dynamic regulation with control, wherein for this purpose input signals from the aircraft controller, and/or input signals from the sensors on the spoiler, and/or trailing edge flap, are likewise displayed/necessary. The control can be implemented via a closed-loop control circuit, or also by means of a knowledge-based formulation (e.g. a calibrated system with data store), so that an autonomous modus operandi is ensured. All that is necessary is an electrical power supply, or another kind of power supply, to a system compressing and transporting air between the removal by suction at the trailing edge/trailing edge region of the spoiler 30 and ejection in the "kink" region of the main profile 10.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A wing of an aircraft with an upper side and a lower side, the wing comprising:
    a main wing, which has an upper surface positioned on the upper side, and a lower surface positioned on the lower side, which surfaces in each case run along a main wing chordwise direction;
    at least one high lift flap coupled to the main wing such that the at least one high lift flap is movable between a retracted and an extended setting; and
    at least one spoiler coupled to the main wing such that the at least one spoiler is rotatable and projects beyond a trailing edge of the main wing;

wherein the main wing has a plurality of ejection openings, of which a plurality are arranged side-by-side along a main wing spanwise direction, and which are connected in terms of flow via an air conduit with an outlet device of a flow delivery driver device arranged on the main wing or on the spoiler;

wherein the spoiler has a plurality of inlet openings for intake of air, which are arranged side-by-side in a spoiler spanwise direction, and which in each case are connected in terms of flow via an air conduit with an inlet device of the flow delivery driver device; and wherein the flow delivery driver device has a receiver device for reception of command signals for purposes of adjustment of the flow delivery driver device in such a manner that air flowing around the wing is sucked in through the inlet openings on the spoiler and said air is ejected through the ejection openings on the main wing.

2. The wing in accordance with claim 1, wherein the plurality of ejection openings of the main wing are arranged side-by-side along the main wing spanwise direction, and in the main wing chordwise direction are arranged in a region between 40% and 90% of a wing chord of the total wing, and which are connected in terms of flow via the air conduit with the outlet device of the flow delivery driver device arranged on the main wing, or on the spoiler.

3. The wing in accordance with claim 1, wherein the plurality of inlet openings of the spoiler for the intake of air are arranged side-by-side in the spoiler spanwise direction and in a spoiler chordwise direction are arranged in a region between 70% and 100% of a spoiler chord as seen from a front end of the spoiler.

4. The wing in accordance with claim 1, wherein the wing has a leading edge slat, and wherein the plurality of ejection openings are positioned from a tip of the total wing in the main wing chordwise direction in a region between 40% and 90% of a wing chord of the wing, with the leading edge slat retracted, and with the high lift flap retracted.

5. The wing in accordance with claim 1, wherein at a location on the main wing spanwise direction and as seen in the main wing chordwise direction of the main wing a plurality of ejection openings are arranged one behind another.

6. The wing in accordance with claim 1, wherein ejection openings positioned side-by-side in the main wing spanwise direction as seen in the main wing chordwise direction of the main wing are arranged displaced relative to one another on the upper side of the main wing.

7. The wing in accordance with claim 1, wherein the ejection openings are arranged such that an angle between a direction of an opening out of the air conduit at each ejection opening and a planar extent of the upper surface at this location is between 0 degrees and 60 degrees, so that within predetermined limits a tangential ejection of air takes place through the ejection openings.

8. The wing in accordance with claim 1, wherein the ejection openings on the main wing are designed as a slot and a length of at least a fraction of the ejection openings as seen in the main wing spanwise direction is between 1% and 50% of a main wing chord at a spanwise location of the respective slot.

9. The wing in accordance with claim 1, wherein the inlet openings on the spoiler are designed as slots and a length of at least a fraction of the inlet openings as seen in the spoiler spanwise direction is between $1/10$ and $1/4$ of a spoiler chord of the spoiler at this location.

10. The wing in accordance with claim 1, wherein the main wing has: on at least a fraction of the ejection openings of the main wing in each case an opening alteration device for purposes of opening and closing the respective ejection opening with an opening alteration mechanism and an actuator coupled to the latter for purposes of actuating the respective opening alteration mechanism.

11. The wing in accordance with claim 10, wherein the opening alteration device has a slider, which, by virtue of an actuation by the actuator, partially or completely opens or closes the respective ejection opening.

12. The wing in accordance with claim 11, wherein the actuator on the basis of a driver signal periodically opens and closes the slider and thereby the ejection opening in order to effect a pulsed ejection of the air through the ejection opening.

13. An arrangement of a wing with a device for purposes of flow control, the wing formed in accordance with claim 10, wherein the device for purposes of flow control has: a driver device functionally connected with a flight control device to control the opening alteration device, wherein the driver device has a driver function, which receives from the flight control device at least one of a setting status of the spoiler and setting status of the high lift flap as an input parameter, and on the basis of the setting statuses in each case generates an appropriate regulating signal for purposes of driving the opening alteration device and transmits this to the latter to control adjustment of the opening alteration device.

14. The wing in accordance with claim 1, wherein on at least a fraction of the ejection openings of the main wing in each case is arranged a pulse generator-actuator, which upon an appropriate input signal effects a pulsed ejection of the air.

15. The wing in accordance with claim 1, wherein on at least a fraction of the ejection openings of the main wing in each case is arranged an opening alteration device with an actuator, with which an orientation of a respective ejection opening relative to a surface of the main wing is adjustable.

16. An arrangement of a wing with a device for purposes of flow control, the wing formed in accordance with claim 1, wherein the device for purposes of flow control has: a driver device functionally connected with a flight control device to control performance of the flow delivery driver device, wherein the driver device has a driver function, which receives from the flight control device at least one of a setting status of the spoiler and a setting status of the high lift flap as an input parameter, and on the basis of the setting statuses in each case generates an appropriate regulating signal for purposes of driving the flow delivery driver device and transmits this to the latter to control through flow of the flow delivery driver device.

17. The arrangement of the wing with the device for purposes of flow control in accordance with claim 16, wherein
   the device for purposes of flow control has: a sensor device arranged on at least one of the main wing, the spoiler, and the high lift flap, with a sensor for purposes of recording flow status of the flow attached to or separated from at least one of an upper side of the spoiler and an upper side of the high lift flap, which is functionally connected with the driver device, and
   the driver function has a control function for purposes of controlling a prescribed flow parameter of the adjustable flap, which is functionally connected with the sensor device for purposes of receiving current flow parameters, with a setting flap positioning device for purposes of receiving a parameter for the setting status of the adjustable flap, and with at least one of the flow delivery driver device and an opening alteration device for purposes of transmitting a regulating signal for purposes of control through flow of at least one of the flow delivery driver device and the opening alteration device.

18. The arrangement of the wing with the device for purposes of flow control in accordance with claim 17, wherein the sensor device is positioned in at least one of a region between 40 and 90 percent of a total main wing chord of the main wing, a region between 40 and 90 percent of a total spoiler chord of the spoiler, and a region between 40 and 90 percent of a total flap chord of the high lift flap.

19. The arrangement of the wing with the device for purposes of flow control in accordance with claim 17, wherein the sensor is a hot wire sensor for purposes of recording a velocity gradient and wherein the driver function has a function for purposes of converting the velocity gradient into a wall shear stress, and the determination of driver signals takes place on the basis of the wall shear stress determined.

20. The arrangement of the wing with the device for purposes of flow control in accordance with claim 17, wherein the sensor is a piezo-wall shear stress sensor for purposes of recording wall shear stress.

* * * * *